Aug. 27, 1957 H. HOLZWARTH 2,803,946
EXPLOSION TURBINE PLANT ASSEMBLY
Filed Dec. 24, 1951 4 Sheets-Sheet 1

INVENTOR.
Hans Holzwarth
BY
Joseph Hirschman
ATTORNEY

Aug. 27, 1957 H. HOLZWARTH 2,803,946
EXPLOSION TURBINE PLANT ASSEMBLY
Filed Dec. 24, 1951 4 Sheets-Sheet 2
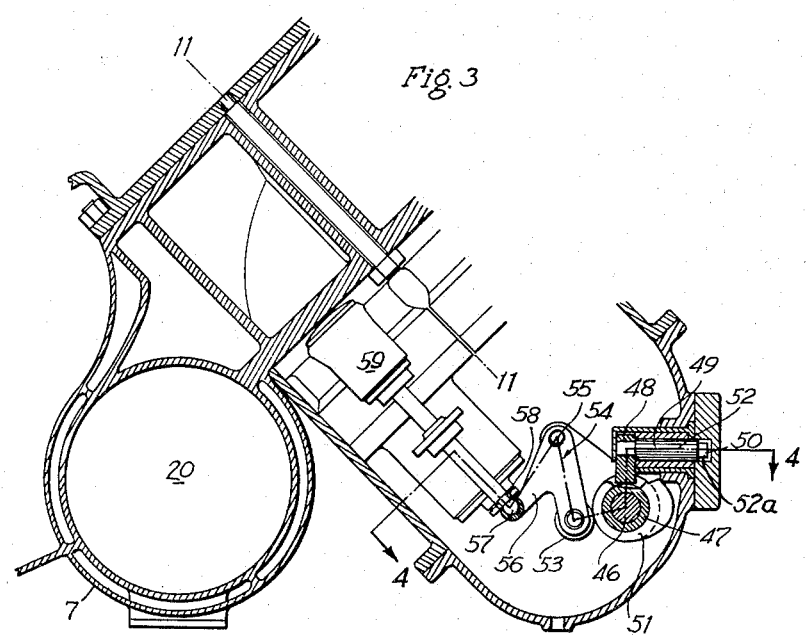
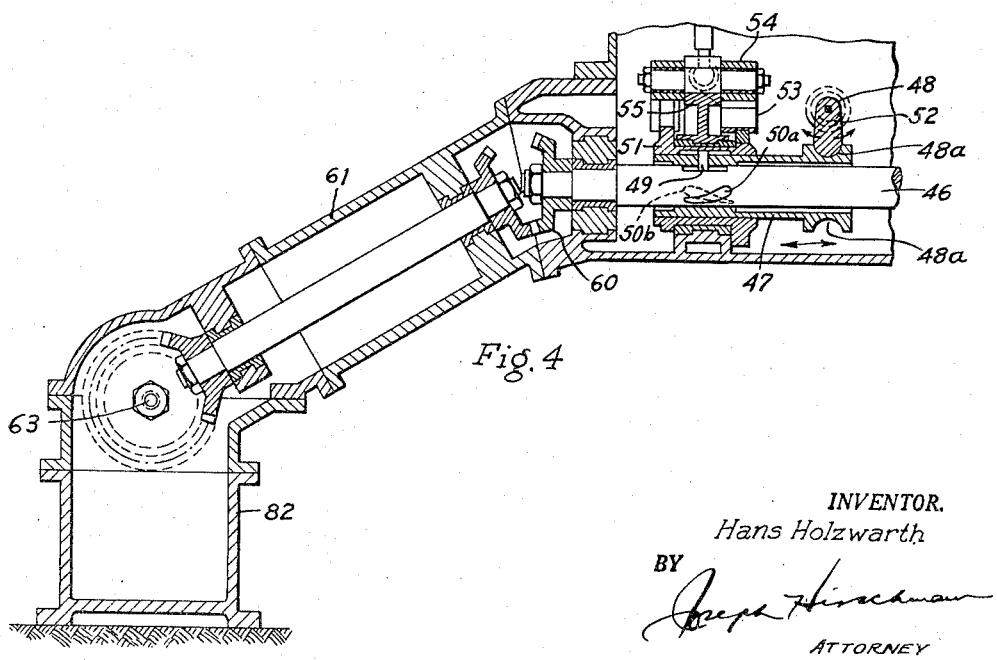
INVENTOR.
Hans Holzwarth
BY
ATTORNEY

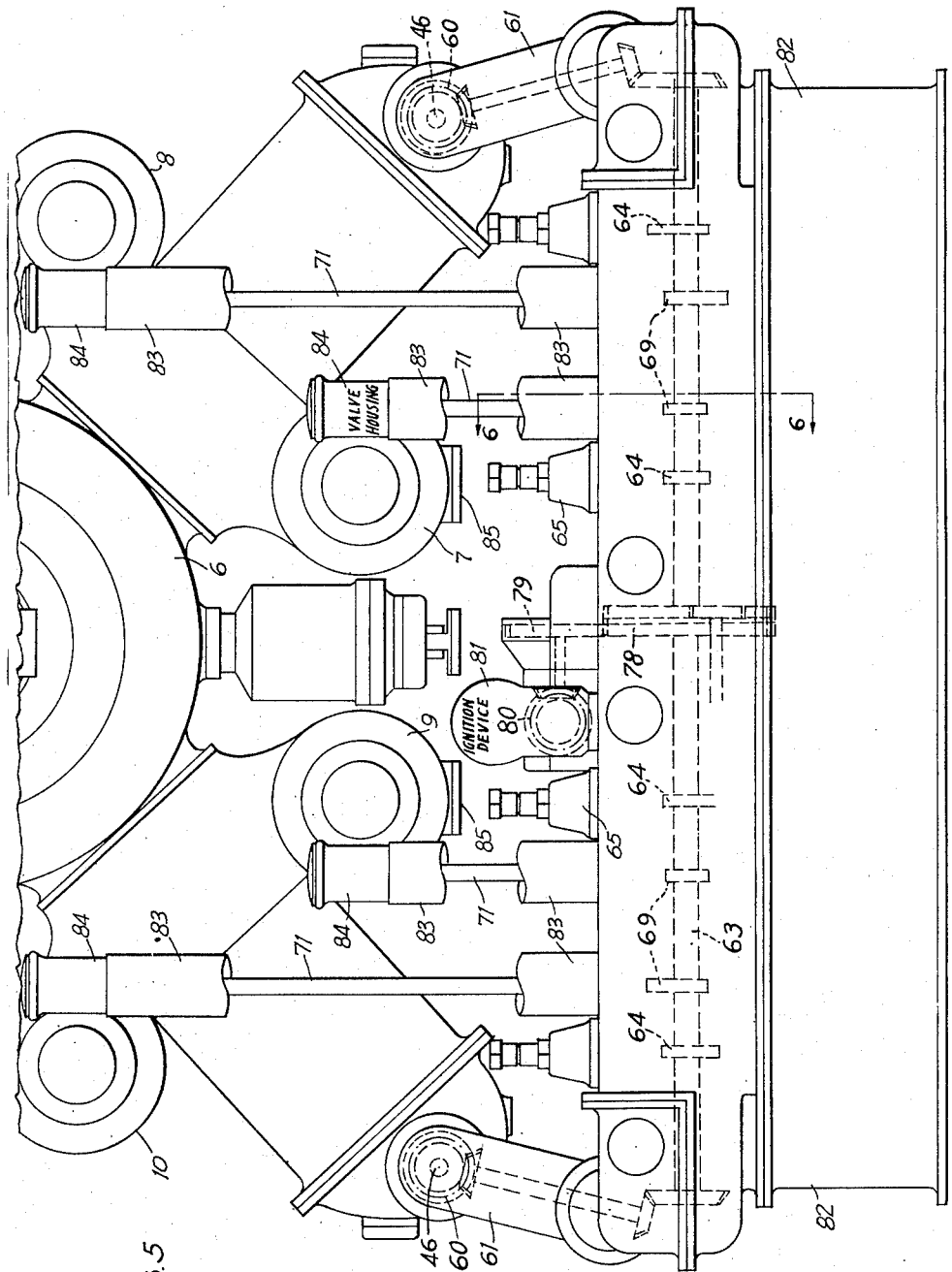

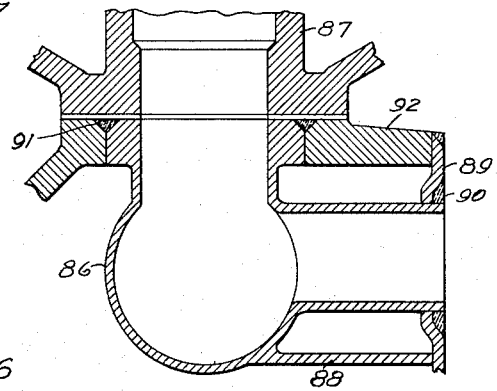
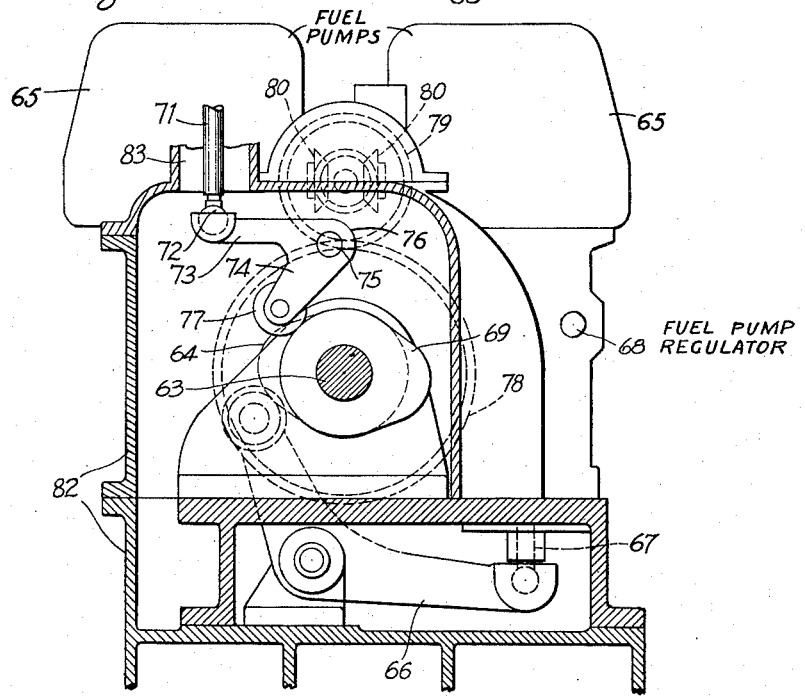

United States Patent Office 2,803,946
Patented Aug. 27, 1957

2,803,946

EXPLOSION TURBINE PLANT ASSEMBLY

Hans Holzwarth, Dusseldorf, Germany, assignor to Schilling Estate Company, San Francisco, Calif., a corporation of California Application December 24, 1951, Serial No. 263,120

19 Claims. (Cl. 60—39.38)

The present invention relates to explosion turbines, particularly for use as generators of driving gases by explosion with a nozzle and blading arrangement impinged by the combustion gases.

It is the general object of the invention to provide an improved arrangement of the parts of an explosion turbine plant whereby simplicity of construction, accessibility of parts, assembly of gas-swept elements into a unit for easy mounting and demounting and disposition within a limited sector of the turbine housing, simplification of control of the valves, and other advantages are attained which, together with more specific objects of the invention, will appear from the description hereinafter.

For explosion turbines designed to supply hot combustion gas under pressure for use outside such turbines, there has recently been proposed a process which is characterized by identity between the number of working cycle sections and the number of the explosion chambers associated with the impinged nozzle and blading arrangement. This process affords the possibility of displacing the working cycles in the individual explosion chambers by a working cycle section with respect to each other in time. Assuming a plant composed of three working cycle sections in the simplest of cases, whose first cycle section is composed of the charging of the explosion chambers with simultaneous displacement of the combustion residue of the preceding explosion, and whose second working cycle section is composed of the ignition and explosion of the charge, while the third working cycle section is occupied by the expansion of the generated combustion gases, then, of the three explosion chambers, one chamber would during the first working cycle section be undergoing the cycle section or phase of charging and residual combustion gas scavenging, the second chamber would be subjected to the cycle section or phase of ignition and explosion, and the third chamber to the cycle section or phase of expansion, these three events occurring simultaneously in the three chambers.

When the time interval allotted to this working cycle section has elapsed, then the working cycle section of ignition and explosion would begin in the first chamber, in the second chamber the cycle section of expansion, and in the third chamber that of charging and residual combustion gas scavenging. Finally, during the last third of the time interval of a complete working cycle, the working cycle section of expansion would occur in the first chamber, that of charging and residual gas scavenging in the second chamber, and that of ignition and explosion in the third chamber. Thereby the result is obtained that one chamber is always in the condition of expansion, that is, the associated nozzle and blading system is continually impinged. This reacts favorably on the operating conditions of the turbine, particularly in the avoidance of harmful torsional vibrations, in minimizing the occurrence of resonance frequencies in the output mechanism, and favorably, also on the degree of irregularity of the turbine, on the heat transfer conditions, etc. If the process is changed by carrying out the expansion during more than one working cycle section, that is, if a working cycle section is provided for each of a number of partial expansions, then further advantageous effects arise with regard to the constancy of the partial enthalpy drops to be utilized in the nozzles and bladings, so that high rotor efficiencies arise. The result can further be obtained that the magnitudes of the the partial drops are so determined that single-row wheels suffice for efficiently converting the partial drops. Thereby the guiding or reversing blades are eliminated, which blades usually lead to difficulties in operation, particularly as regards adequate cooling thereof, since they are located continually in the path of the hot gases whereas the rotor blades are subject to the favorable effects of pauses in their impingements by the gases occurring in the interval between the moment when a blade is positioned in front of the impinging nozzle and the instant in which it is again located in front of the same nozzle when it is again impinged.

It is of the essence of the above described process that in general there will be employed at least three, and when two partial expansions are employed, there will be at least four explosion chambers associated with the common nozzle and blading system. An improved construction embodying such mode of operation, wherein there is arranged about the nozzle and blading systems a series of elongated explosion chambers with their longitudinal axes parallel to the axis of the rotating bladings with either complete or partial axial overlapping of the turbine housing and explosion chamber lengths, is described in my copending application, entitled, "Heat Power Plant With at Least One Explosion Turbine and at Least One Consumer Unit," filed December 24, 1951, Ser. No. 263,-119, now Patent No. 2,750,740, dated June 19, 1956.

However, corresponding to earlier proposals, in which the explosion chambers were attached to the turbine housing in the axial direction, i. e., they extended axially in the opposite direction from their plane of attachment, the chambers were uniformly distributed in a circle about the housing, with gas and other connections among the several chambers. I have found, however, that this arrangement has the disadvantage that the accessibility of the turbine housing suffers, and that above all the whole turbine housing contains gas-swept parts of whose heat expansions and otherwise increased stresses account must be taken by suitable structural modifications. In particular, the gas-swept parts must all or nearly all be cooled, so that the disposition of the cooling spaces alone, and also the provision of the cooling liquid inlets and outlets themselves introduce certain difficulties whose removal it is an object of the present invention to accomplish.

The problem described above has been solved in accordance with the present invention by uniting a plurality of explosion chambers in block-like units, each unit subtending less than 180° of rotor casing circumference, and preferably less than 90°, the chambers being preferably combined in pairs, with their longitudinal axes parallel to the axis of the rotor carrying the bladings and disposed about the turbine housing. By this block-like union of at least two explosion chambers there occurs such a contraction of the group of chambers in the peripheral direction that it is possible to dispose all of the chambers about only a part of the housing, again viewed in the peripheral direction, even when their number becomes considerable when made equal to the number of working cycle sections, which itself can be relatively large depending upon the selected mode of operation. By uniting the chambers block-wise in pairs, it is possible without any difficulty to arrange as many as four explosion chambers about only half of the housing circumference. If the housing is made in two parts, then the result is obtained that the other housing half can be constructed as a simple upper or lower cover, since such part needs fulfill only the function of forming the rotor chamber and providing a closure against the escape of gases. This results in an extensive simplification of the whole turbine structure. By keeping the chamber group and its parts separate from the other half of the turbine housing, the two housing halves can be easily separated by lifting one away from the other, so that the interior of the turbine is readily exposed for inspection. The housing section, which is free from gas-contacted elements (and which may subtend less than 180°), can normally be connected to the other housing part containing the gas-swept elements, by means of screw connections embedded in jacket-like tubular elements, and thus invisible, and preferably subsequently hard-soldered, such screw connections penetrating flanges connecting the housing parts, and extending preferably horizontally.

The union of the chambers into a block can be accomplished in any desired fashion, as by flanging with screw connections, casting into one piece, welding, etc.

My improved turbine construction presents the further possibility of uniting all of the gas-contacted elements, which are throughout constructed as thin-walled, bladder-like bodies consisting of assembled individual parts, like impinging and catch nozzles, collector chambers, transfer conduits, connecting elbows, etc., and if desired also the labyrinths and the like, into a common insert which can be mounted in or removed from the associated housing section as a unit. Thereby there occurs a further simplification because the whole assembly and disassembly of this complicated turbine part can be accomplished outside of the housing. For supporting the turbine rotor on insertion into and removal from the insert containing the gas-contacted parts there are provided special support devices, as in the form of inclined screw-bolts.

There exists the further possibility of constructing the side cover plates, bearing and stuffing boxes of the turbine in undivided form where the turbine housing itself is divided so that thereby further advantages arise.

Particularly improved over-all arrangements result when a double chamber block is disposed at both sides of the lower part of the housing, preferably with an inclination of the axis of symmetry of each double chamber block of about 45° to the partition plane of the turbine housing, which is preferably horizontal. This produces above all advantageous, flow-technically favorable arrangements of the valves, as the transfer conduits between the explosion chamber interiors and nozzle valve seats, which can be constructed in, or approximately in, planes tangential to the turbine housings, can be built in the form of thin-walled, curved and cooled bladder-like bodies, in whose throat portions disposed toward the valve seats there extend the terminally semi-spherical cylinders of the nozzle valves located between the chambers of each double chamber block, approximately tangentially to the bends of the two throats which approach each other most closely. In the same way, the spaces which are connected to the seats of the outlet valves for the residual combustion gases of the chambers of the double chamber blocks can be constructed as thin-walled, rounded bladder-like bodies which are fitted to the available spaces between the turbine inner and outer housings by giving them a flatly compressed, pocket-like form, the throats of such bladder-like bodies which are open toward the driving gas withdrawal conduit being bent in the direction of their longitudinal extensions.

My improved turbine construction, however, places high demands on the construction of the control mechanism, especially when the control is effected mechanically-hydraulically. In accordance with the present invention, the axis of the control shafts which actuate the nozzle and outlet valves of each double chamber block is arranged parallel to the turbine axis. If it is disposed in the plane of symmetry of each double chamber block, there arises further the possibility of arranging the axes of each two nozzle and outlet valve seats belonging to the two explosion chambers of each double chamber block in planes running perpendicularly to the turbine axis, and to allow it to run parallel to the plane of symmetry of the associated double chamber block. On the other hand, the axis of the control shafts actuating the inlet valves of the explosion chambers is arranged perpendicularly to the turbine axis. This presents the possibility of taking off both control shaft drives from a common, horizontal, transverse gear shaft which extends perpendicularly to the turbine axis, and to utilize this control transverse gear shaft, constructed as the main control shaft, for the drive of other auxiliary machines. By this novel construction of the control mechanism gearing, it is possible to adapt the control to the whole structure of the explosion turbine plant to fulfill conveniently all control problems, and nevertheless to dispose the control mechanism most conveniently, which can be accomplished especially by arrangement of the main control shaft beneath the floor of the plant.

At the same time the result is attained that the housings enclosing the main control shaft can be constructed as an element which reinforces the machine frame like a framework. In consequence, a special machine frame can be entirely dispensed with, as the double chamber blocks can themselves likewise be formed as elements of this machine frame, that is, they on their part contribute to form the machine frame. The turbine housing itself is then supported on the double chamber blocks and in turn stiffens the machine frame. If the lowermost double chamber blocks lie against the machine foundation and if they unite the described machine structure with the foundation, then the necessity of constructing a special machine base frame likewise disappears.

Further features and advantages of the invention will appear from the following more detailed description taken in connection with the accompanying drawings which show a four-chamber explosion turbine plant. In said drawing, Fig. 1 shows schematically a side view of the whole plant, one of the chambers being shown in vertical longitudinal section along the plane 1—1 of Fig. 2;

Fig. 2 represents a vertical transverse section of the turbine along the plane 2—2 of Fig. 1; the section cut by the vertical plane indicated at the left in Fig. 1 being shown at the right in Fig. 2, while the section cut by the vertical plane at the right in Fig. 1 is shown at the left in Fig. 2, the valve control mechanism and the housing surrounding the nozzle valves not being shown in Figs. 1 and 2 for the sake of clarity;

Fig. 3 shows the construction of the control mechanism of a nozzle valve in detail;

Fig. 4 is a vertical section along the plane 4—4 of Fig. 3;

Fig. 5 is a front view of the control mechanism of the turbine;

Fig. 6 is a vertical transverse section along the plane 6—6 of Fig. 5; while

Fig. 7 is a section showing a modified construction of the parts providing the seat for the outlet valve and the connection to the lead-off conduit.

Figure 2:
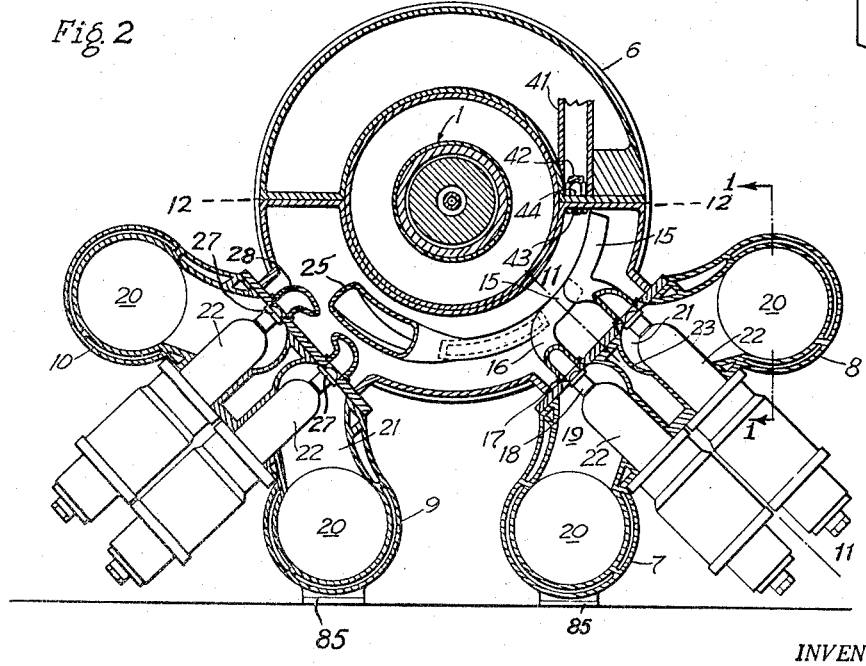

Referring to the drawings, the numeral 1 indicates the rotor composed of the two wheels 2 and 3 having the single rows of blading 4 and 5. The turbine housing enclosing these parts is shown at 6. Associated with the rotating blading system 1 to 5 are four explosion chambers which in accordance with the invention are united in pairs into a double chamber block. In Fig. 2 there is shown the double chamber block with the explosion chambers 7 and 8 at the right. A corresponding double chamber block is disposed at the left side with the explosion chambers 9 and 10. It will be seen that the plane of symmetry of each double chamber block which cuts the plane of the drawing along the line 11—11 in Fig. 2 runs approximately 45 degrees to the horizontal plane 12—12 of the turbine housing 6. While the turbine housing is divided into two sections along the joint 12—12, the lateral cover plates 13, the bearing 14, the not visible stuffing boxes, as well as the not illustrated labyrinths and packings are made undivided, i. e. each is of one piece. The chambers of each double chamber block, as can be seen from Fig. 3, are united with each other by casting. By this arrangement there results the possibility, already mentioned above, that the upper half of the housing 6 can be constructed as a simple housing cover, and of disposing the gas-contacted constructional elements in the lower half of the housing to which the explosion chambers are attached. These gas-contacted parts include, in addition to the already mentioned rotor 1, the nozzles 15 which are arranged in advance of the blading 4 of wheel 2. The nozzle pre-chambers 16, as can be seen from Fig. 2, are constructed as hollow shoes, whose end disposed toward the heel is constructed as the seat 17 for the nozzle valve 18, while the hollow tip of the shoe is extended to the already mentioned nozzle segment 15. Fig. 2 shows further that the seats 17 of the nozzle valves lie in, or approximately in, a plane perpendicular to a radius of the turbine housing 6. As a result, there arises the possibility of constructing the passageways 19 between the explosion chamber interiors 20 and the nozzle valve seats 17 as thin-walled, curved and cooled bladder-like bodies into whose throats 21, located on the valve seat side, there extend the terminally semi-spherical guide cylinders 22 of the nozzle valves which are disposed between the chambers of each double chamber block, approximately tangentially to the rounded portions of the two transition throats 21 which approach each other most closely at 23 with formation of combustion gas deflectors of low flow resistance.

Behind the first turbine stage comprised of the parts 15, 4, there is disposed a catch nozzle arrangement 24 to which is connected a collecting chamber 25 whose outlet is formed as the nozzle 26 in advance of the blading 5 of the second turbine stage 26, 5. This construction is shown more fully in the copending application of Hans Holzwarth and August H. Schilling, Serial No. 263,116 filed simultaneously herewith. This application has issued as Patent No. 2,750,736, dated June 19, 1956. The collector chamber 25 receives not only combustion gases by way of the catch nozzle 24 which have been subjected to a partial expansion in the first turbine stage 15, 4, but also live combustion gases directly from the explosion chambers through the nozzle valves 27 whose construction does not differ from that of the valves 18. For this purpose, an elbow 28 (Figs. 1 and 2) is connected to the seat of the nozzle valves 27, such elbow passing over at 29 into the collector chamber 25.

Behind the second turbine stage 26, 5, there is disposed a catch nozzle 30 which conducts the combustion gas portions subjected to the second partial expansion to the driving gas withdrawal conduit 32 by way of the pipe 31. Through the withdrawal conduit 32 the consumer apparatus 33 receives the driving gases required for its operation. The rotor 1 of the explosion turbine on its part drives the auxiliary machines of the plant through the coupling 34, in so far as they are not directly connected with the combustion turbine, like ignition machines, and fuel pumps. In the present case, the auxiliary machines located outside of the explosion turbine consist of the air compressor 35; in the event of operation with fuel gas, the gas compressor would likewise have to be driven.

Figure 1:
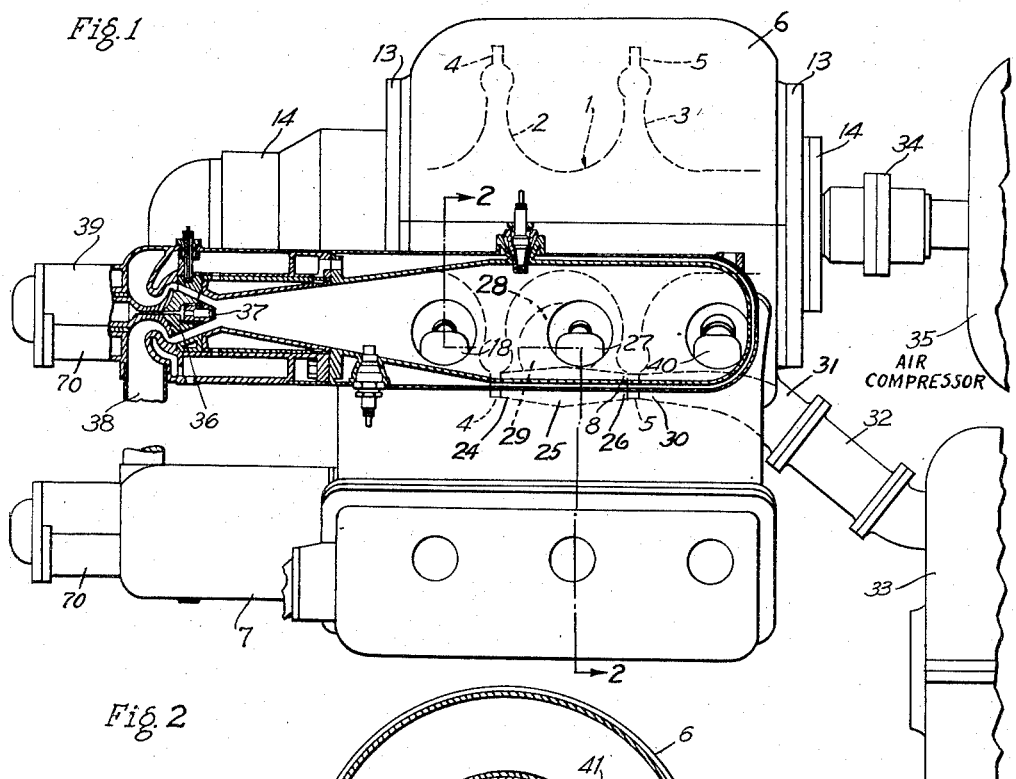

As can be further seen from Fig. 1, each explosion chamber is provided with an air charging valve 36 into which the fuel injection valve 37 is directly built in. An air supply conduit 38 connects the explosion chambers with the air compressor 35, if necessary with insertion of an intermediate cooler. The control of the air charging valve 36 is schematically indicated at 39. The fuel supply conduit to the valve 37 is of conventional construction and has for that reason not been illustrated.

The conduits which are connected to the not yet mentioned outlet valve 40 of the explosion chamber 8 shown in section in Fig. 1 have likewise not been illustrated. These conduits which are connected to the seats of the outlet valves 40 of the double chamber blocks in the direction of flow of the gases, are likewise constructed as thin-walled, gas-swept and cooled bladder-like bodies which are fitted to the available spaces between the turbine inner and outer housings by a flat, pocket-like shape. The throat portions of these bladder-like bodies are open toward the gas withdrawal conduit 32 and are curved in the direction of their longitudinal extension, as shown in Fig. 2 of my copending application, Serial No. 263,119 filed of even date herewith, and now Patent No. 2,750,746, dated June 19, 1956. Thereby the result is obtained that the expansion of the combustion gas residue, which occurs in these spaces and further on in the driving gas withdrawal conduit 32, can be communicated by way of the connection 31 and catch nozzle arrangement 30 to the wheel chamber space of the wheel 3. Accordingly, the second turbine stage is subjected to a counter-pressure having the character of a periodic expansion. Since it occurs synchronously with the impingement of the nozzle 26 and of the blading 5 of the second turbine stage by reason of the above-described displacement of the working cycle sections in the individual chambers, there is realized in this turbine stage an approximately constant partial drop, which leads to high rotor efficiencies and can at the same time be so dimensioned that the single-row blading 5 suffices for converting such partial drop. The conditions described in connection with the second turbine stage naturally apply also to the first turbine stage. The periodically fluctuating internal pressure in the collector chamber 25 occurring under the influence of both streams of combustion gases is exerted on the preceding turbine stage 15, 4 by way of the catch nozzle 24 and acts as a counter-pressure. The course of the internal pressure of the collector 25 in turn has the character of an expansion, since the collector is in open communication by way of the nozzle 26 with the attached rotor chamber of wheel 3 of the second turbine stage. Here, again, the fact that the so-described counter-pressure formation develops synchronously with the changes in the impingement pressures of the first turbine stage is likewise to be traced to the already mentioned displacement of the working cycle by a cycle section in the individual chambers. In consequence of the similar characteristic and of the synchronous course of the impingement and counter pressures, the first turbine stage is likewise subject to practically constant partial drops, so that it can be driven with high rotor efficiency. The partial drop which is converted in this turbine stage is again to be so proportioned that single-row blading 4 suffices for converting the same.

The mode of production of the combustion gases is itself known. Upon opening of air valve 36 there is simultaneously opened also the outlet valve 40. The incoming air, because of the gentle slope of the diffusor section of the inlet of the chamber which leads from a venturi-like nozzle at the inlet end of the chamber, assumes the form of a piston, so that the so-formed compressed air piston pushes the combustion gas residue of the preceding explosion through the open outlet valve 40. This combustion gas residue of a pressure corresponding to that of the charging air, is employed for the formation of the already described counterpressure with reference to the turbine stage 26, 5. During this process, the plunger of the fuel pump performs its feed stroke and sprays into the advancing compressed air piston a quantity of fuel which corresponds to the required output at any time. In this way there is formed in the explosion chamber an ignitable mixture even during the scavenging.

This mixture fills the chamber completely at the instant in which the valves 36 and 40 close. This completes the first working cycle section. There follows the working cycle section of ignition and explosion with all the valves closed, the ignition devices being known and for that reason not being illustrated. After the cycle section of ignition and explosion, there follows that of the first partial expansion in which the nozzle valve 18 opens. At the same time, the nozzle valve 27 of another cyclically advanced chamber opens and discharges a lower pressure combustion gas portion into the collector 25. The latter thus receives simultaneously combustion gases from the turbine stage 15, 4, through the catch nozzle 24 and directly from one of the other explosion chambers by way of its opened nozzle valve 27 and elbow 28. Under the influence of both of these combustion gas streams, the pressure in the chamber 25 repeatedly builds up even as gases are continuously discharged from such chamber by way of the nozzle 26 for the impingement of the blading 5 of the second turbine stage 25, 5. A third chamber has simultaneously with these two events opened its outlet valve 40 so that the combustion gas residue of such chamber has been expelled through such outlet valve and has given rise to a corresponding counterpressure development in the wheel chamber space of the second turbine stage. In a fourth chamber there has in turn occurred ignition and explosion simultaneously with these three events. What has been said in connection with chamber 8 applies naturally to all of the other explosion chambers of the plant.

Fig. 2 shows in detail the attachment of the upper housing half to the lower. To this end, threaded connections 42 are provided which are sunk in the encasing tube 41 and are thus not visible, the same being subsequently hard-soldered, the threaded connections penetrating the horizontal flanges 43, 44. As clearly shown in Fig. 2, all gas-contacted elements are united into a common insert which can be mounted as a whole into the lower housing half or removed therefrom as a unitary assembly.

Figs. 3 and 4 show the detailed construction of the explosion chambers and of the nozzle valve control. The control mechanism itself is mechanically-hydraulically operated. Each double chamber block has a control shaft 46 (Fig. 3) lying in its plane of symmetry 11—11 (Fig. 2), and extending parallel to the axis of the turbine rotor 1, there being arranged on the shaft 46 a rotatable bush 47 opposite to the nozzle and outlet valves. A cam 51 is mounted on the bush 47, and its angular position at any time relative to the shaft 46 with which it rotates is adjustable by means of an arm 48 having a ball end which is received in an annular groove 48a in the bush 47. The bush has one or more pins or teeth 49 passing through the same and extending into oppositely directed helical or cam slots 50a, 50b in the facing surfaces of the cam 51 and shaft 46. The lever 48 is secured to a bolt 52 having a square end 52a by which it may be rotated by a wrench or the like to effect axial displacement of the bush 47 and hence angular adjustment of the cam. Other mechanism for altering the timing of the cams 51 can, of course, be employed.

The rollers 53 of the two-armed angular lever 54 bear against the cams 51, such lever being journaled at 55. The second, free arm 56 of the angular lever terminates in a cup-shaped bearing 57 in which the pressure head 58 of the preliminary control slide 59 of the nozzle valve 18 is received. This control slide brings the pressure medium, for example in the form of pressure oil, into action in dependence upon the rotary movements of the control shaft 46, upon the not illustrated control surfaces of the valve 18 at definite instants during a definite time interval, or releases them from oil pressure while another control surface is placed under load. Pursuant to these control movements, the nozzle valve 18 is opened or closed during definite time intervals. What has been said in connection with the one nozzle valve applies in similar fashion for all other nozzle valves of the same double chamber block and for the four nozzle valves of the other double chamber block. It applies also to the outlet valves 40 of the two double chamber blocks which are mechanically-hydraulically controlled from the same control shaft 46. The fine adjustment is effected when necessary by way of the square end 52a.

The control shaft 46 carries the driving gears 60 (Fig. 4). These driving gears 60 are connected with the main control shaft 63 (Fig. 5) by way of parts not illustrated. As this specific construction forms no part of the present invention, it is not deemed necessary to illustrate it in detail. The housing 61, on the one hand, and 82 (Fig. 6) on the other, encase these driving parts including the main control shaft 63. The axis of this control shaft 63 extends below the explosion chamber blocks 7, 8 and 9, 10 and of the turbine housing 6, and in a direction perpendicular to the axis of the rotor of the turbine. On the main control shaft 63 there are disposed the driving cams 64 of the fuel pumps 65 (see Figs. 5 and 6), a two-armed lever 66 transferring the cam movement to the plungers 67 of the fuel pumps 65. The regulation of the fuel pumps is indicated at 68.

There is further arranged on the main shaft 63 the cams 69 (Figs. 5 and 6) serving for actuating the charging air valves 36. For this purpose, there are again disposed preliminary control slides in the housings 70, corresponding to preliminary control pistons 59 (see Fig. 3) of nozzle valves 18. These control slides rest on rods 71 whose pressure heads 72 are received in the bearings 73 of the angular levers 74, the latter rotating about the pivot bolts 75. The free arm 76 carries the rollers 77 which bear against the actuating cams of the main control shaft 63. On the latter there is further arranged the wheel 78 provided with two sets of teeth. The first set of teeth of such wheel engages the pinion of the electric driving motor of the main control shaft 63. Into the second set of teeth there engages the gear 79 which on its parts carries a bevel gear. With the latter there mesh the bevel gears 80 of the ignition device 81.

The main control shaft is disposed in a housing 82 which forms a rigid assembly with the tubular guides 61 of the inclined driving shafts of the control shafts 46 and with the tubular housings 83 of the air valve control rods 71, and further with the double chamber blocks 7 to 10, the housing 6, and the valve housing 84. The parts 61, 82, and 83 are of such rigid nature that no further reinforcing structure or framework is necessary to enable the whole assembly to be supported upon the chambers 7 and 9 at 85. In this way there are eliminated both a special machine frame as well as a foundation frame for the machine, as all housings form struts or elements of a machine frame and are interconnected as a framework.

Fig. 7 shows a modified construction which enables the inner parts associated with the seat for the outlet valve to be assembled outside the turbine casing. The elbow 86, which is secured to and sealed against the part 87 of the explosion chamber provided with the seat for the outlet valve (with the aid, if desired, of an interposed gasket) and is formed with the integral cooling jacket 88, is welded to the cover plate 89 as shown at 90. The cover plate surrounds the discharge end of the elbow which connects with the lead-off conduit. The elbow is welded also to the part 92 as shown at 91.

Although in the illustrated embodiment of the invention the four explosion chambers are arranged about the lower half of the turbine rotor casing, it will be evident that they can be arranged also about the upper half, in which case the nozzles, collecting chamber and other gas passageways will be disposed in the upper half of the rotor casing. Upon disconnecting the casing halves, the upper half can be lifted with a crane or the like for inspection and repair of the rotor and of the gas passageways. It is within the scope of the invention to provide two groups of explosion chambers, say of four chambers each, one group about the upper and the second about the lower half of the rotor casing, each group being structurally separate from the other, so that the two portions of the casing can be separated from each other, each with its associated group of explosion chambers, nozzles and gas conduits connected thereto, without the necessity of dismantling any of the chambers, nozzles or gas conduits. Each rotor housing or casing section, with its explosion chambers secured to the outside thereof and the nozzles and gas conduits mounted within it, thus becomes a complete structural unit which can be flanged or otherwise detachably secured to the other housing section.

I claim:

1. In an explosion turbine plant, the combination of a bladed rotor adapted to be impinged by high pressure explosion gases, a nozzle assembly for directing explosion gases against the rotor blading, a housing for the nozzle and rotor, and a plurality of explosion chambers disposed about the turbine housing with their longitudinal axes parallel to the axis of the rotor and in overlapping relation with respect to said housing, each of said chambers being provided with nozzle and outlet valves operable to discharge all of the explosion gases generated in each chamber directly into the turbine housing, said explosion chambers being united into blocks each constituting a structural unit and each including a plurality of non-identically but symmetrically constructed chambers.

2. Explosion turbine plant according to claim 1, wherein the explosion chambers as a whole subtend only a portion of the periphery of the housing, the remainder of such periphery constituting approximately a 180° extent thereof and being free of explosion chambers subtending the same.

3. Explosion turbine plant according to claim 1, wherein the explosion chambers are disposed only about the lower half of the turbine housing, said housing being constructed of separate upper and lower sections, whereby the upper section can be removed to give access to the interior of the housing.

4. Explosion turbine plant according to claim 1, wherein the turbine housing is divided along an approximately horizontal axial plane, and wherein a double chamber block is disposed at each side of the lower portion of the housing, the plane of symmetry of each double chamber block having an inclination approximately 45 degrees to the plane of division of the housing, whereby all of the chambers are disposed around at most the lower half of the housing.

5. Explosion turbine plant according to claim 1, including nozzle pre-chambers between the nozzle valves and the nozzles and constructed in the form of hollow shoes having an opening at the heel formed as a nozzle valve seat, while the toe of each hollow shoe is drawn out into the shape of a nozzle segment constituting the said nozzle.

6. Explosion turbine plant according to claim 1, including a control shaft for the valves of each chamber block, the axis of said shaft being parallel to the turbine axis.

7. Explosion turbine plant according to claim 1, wherein each block is comprised of two chambers, and including a control shaft for the valves of each chamber block, the axis of said shaft being parallel to the turbine axis, said control shaft axis being disposed in the plane of symmetry of each double chamber block.

8. Explosion turbine plant according to claim 1, wherein each block is comprised of two chambers, and including a control shaft for the valves of each double chamber block, the axis of said shaft being parallel to the turbine axis, said valves being arranged in pairs behind each other in the direction of the control shaft and being housed in a common valve box, said box being flanged with the associated double chamber block to the turbine housing.

9. In a combustion gas generating plant, the combination of a bladed rotor adapted to be impinged by high pressure explosion gases, nozzles for directing explosion gases against the rotor blading, a housing for the rotor, a plurality of non-identically but symmetrically constructed explosion chambers disposed about and secured to a portion of the housing to a maximum extent of about 180° with their longitudinal axes substantially parallel to the axis of the rotor and in at least partial overlapping relation with respect to the housing, the remainder of the housing being free of connections explosion chambers, and gas conduits connecting the explosion chambers with the nozzles, the nozzles and gas conduits being disposed within the portion of the rotor housing subtended by the explosion chambers, and the rotor housing being split to enable the remainder of the housing to be separated from the said portion of the housing without dismantling any of the explosion chambers, nozzles and gas conduits.

10. In an explosion turbine plant, the combination of a bladed rotor adapted to be impinged by high pressure explosion gases, a nozzle assembly for directing explosion gases against the rotor blading, a housing for the nozzle and rotor, a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, catch nozzles arranged to receive the gases discharging from the rotor, a collector chamber connected to such catch nozzles, and conduits for conveying the combustion gases, said catch nozzles, collector chamber and conduits being combined into the form of an assembly which can be inserted into and removed from the associated housing section as a unit.

11. In an explosion turbine plant, the combination of a bladed rotor adapted to be impinged by high pressure explosion gases, a nozzle assembly for directing explosion gases against the rotor blading, a housing for the nozzle and rotor, a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, catch nozzles arranged to receive the gases discharging from the rotor, a collector chamber connected to such catch nozzles, and conduits for conveying the combustion gases, said catch nozzles, collector chamber and conduits being combined into the form of an assembly which can be inserted into and removed from the associated housing section as a unit, and means for supporting the turbine rotor during the insertion and removal of said assembly.

12. In an explosion turbine plant, the combination of a bladed rotor adapted to be impinged by high pressure explosion gases, a nozzle assembly for directing explosion gases against the rotor blading, a housing for the nozzle and rotor, and a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two explosion chambers, each of said chambers being provided with nozzle and outlet valves, the seats of said valves being disposed in approximately tangential planes with reference to the turbine housing.

13. Explosion turbine plant according to claim 12, including passageways between the explosion chamber interiors and the nozzle valve seats constructed in the form of thin-walled, curved and cooled bladder-like bodies, said bodies having throat portions extending toward the valve seats and having rounded sections curving toward each other, the nozzle valves for both chambers being disposed between the chambers of each block and having guide tubes penetrating said throat portions approximately tangentially to said rounded sections where they approach each other most closely, with formation of gas-deflecting paths of low flow resistance.

14. In an explosion turbine plant, the combination of a bladed rotor adapted to be impinged by high pressure explosion gases, a nozzle assembly for directing explosion gases against the rotor blading, a housing for the nozzle and rotor, and a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two chambers provided with outlet valves, gas passageways connected to the seats of the outlet valves in the direction of gas flow, said passageways being constructed as thin-walled and cooled bladder-like bodies which are in flat, pocket-like form and are fitted to the spaces between the turbine inner and outer housings, and a gas withdrawal conduit, said bodies having throat portions open to said withdrawal conduit and being curved in the direction of their longitudinal extension.

15. In an explosion turbine plant, the combination of a bladed rotor adapted to be impinged by high pressure explosion gases, a nozzle assembly for directing explosion gases against the rotor blading, a housing for the nozzle and rotor, and a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two chambers, and including nozzle and outlet valves for the chambers of each chamber block, a transverse gear shaft, and control shafts for actuating said valves and driven from the transverse gear shaft.

16. In an explosion turbine plant, the combination of a bladed rotor adapted to be impinged by high pressure explosion gases, a nozzle assembly for directing explosion gases against the rotor blading, a housing for the nozzle and rotor, a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, inlet valves for the explosion chambers, control shafts for actuating said inlet valves, the axes of said shafts being disposed perpendicularly to the turbine axis, and means for driving said shafts including a transverse gear shaft extending horizontally but perpendicularly to the turbine axis, and control shafts for the nozzle and outlet valves of the explosion chambers, said transverse shaft driving also said last-mentioned control shafts.

17. In an explosion turbine plant, the combination of a bladed rotor adapted to be impinged by high pressure explosion gases, a nozzle assembly for directing explosion gases against the rotor blading, a housing for the nozzle and rotor, a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two chambers, nozzle and outlet valves for the chambers of each chamber block, control shafts for actuating said valves, and a transverse gear shaft for driving said control shafts, said transverse gear shaft being provided below the explosion chamber blocks and turbine housing.

18. In an explosion turbine plant, the combination of a bladed rotor adapted to be impinged by high pressure explosion gases, a nozzle assembly for directing explosion gases against the rotor blading, a housing for the nozzle and rotor, and a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two chambers, and including nozzle and outlet valves for the chambers of each chamber block, control shafts for actuating said valves, and a transverse gear shaft for driving said control shafts, said transverse gear shaft being provided below the explosion chamber blocks and turbine housing, said plant including fuel injection pumps having driving members therefor, the transverse gear shaft being constructed as the main control shaft and being formed as the carrier of the driving members of the fuel injection pumps.

19. In an explosion turbine plant, the combination of a bladed rotor adapted to be impinged by high pressure explosion gases, a nozzle assembly for directing explosion gases against the rotor blading, a housing for the nozzle and rotor, a plurality of explosion chambers disposed about the turbine housing with their longitudinal axes parallel to the axis of the rotor and in overlapping relation with respect to said housing, said explosion chambers being united into blocks each constituting a structural unit and each including a plurality of non-identically but symmetrically constructed chambers, each of said blocks comprising two chambers, and including nozzle and outlet valves for the chambers in each chamber block, control shafts for actuating said valves, a transverse gear shaft being provided below the explosion chamber blocks and turbine housing, and being constructed as the main control shaft, said plant including ignition machines and a further gear shaft for operating the ignition machines.

References Cited in the file of this patent

UNITED STATES PATENTS

| | | |
|---|---|---|
| 1,164,091 | Herz | Dec. 14, 1915 |
| 1,982,664 | Holzwarth | Dec. 4, 1934 |
| 2,056,198 | Lasley | Oct. 6, 1936 |
| 2,095,991 | Lysholm | Oct. 19, 1937 |
| 2,254,954 | Anxionnaz | June 17, 1941 |
| 2,273,406 | Lasley | Feb. 17, 1942 |
| 2,493,873 | Hill | Jan. 10, 1950 |

FOREIGN PATENTS

| | | |
|---|---|---|
| 508,311 | France | July 21, 1920 |